ELECTROMAGNETICALLY DRIVEN TUNING FORK

Filed Feb. 3, 1969

INVENTORS
BORIS F. GRIB
GEORGE L. VOLLET
BY Darby & Darby
ATTORNEYS

United States Patent Office 3,559,100

Patented Jan. 26, 1971

3,559,100

ELECTROMAGNETICALLY DRIVEN TUNING FORK

Boris F. Grib, Huntington, and George L. Vollet, Massapequa, N.Y., assignors to Philamon Laboratories, Inc., Westbury, N.Y., a corporation of New York Filed Feb. 3, 1969, Ser. No. 795,832
Int. Cl. H03b *5/36*
U.S. Cl. 331—116 7 Claims

ABSTRACT OF THE DISCLOSURE

There is disclosed an electromagnetically driven tuning fork structure with a drive coil and a pickup coil disposed near the end of the tuning fork tines and on opposite sides thereof; the magnetic bias provided by the cores of the coils is symmetric with respect to the tuning fork axis. A low reluctance magnetic circuit is provided including the base of the structure which tends to limit the magnetic flux from the drive coil to the side of the structure occupied by the drive coil and thus limit the influence of stray fields in the pickup coil.

Electromagnetically driven tuning forks are commonly employed in oscillators and filters where the stable-frequency resonance characteristic of the tuning forks is useful in generation of accurate and stable frequency electrical signals or in providing filters for accurate selection of electrical signals in accordance with frequency. A long-recognized problem in connection with electromagnetically driven tuning forks has been stray coupling between the drive coil of such a tuning fork and the pickup coil. Among the techniques for solving this problem have been arrangements wherein multiple pickup and/or drive coils have been employed and arranged to tend to cancel out the stray magnetic coupling.

The cancellation of stray magnetic fields in electromagnetically driven tuning forks is a useful technique in many circumstances, but it does suffer from one disadvantage in that it necessarily requires more than the minimum number of elements for driving the tuning fork and for electrical pickup of the tuning fork vibration.

The present invention does not rely on cancellation of stray magnetic fields originating from the tuning fork drive coil or coils, but rather, provides a structure with magnetic characteristics such that the magnetic flux associated with the drive coil is in a high degree isolated from the pickup coil for the tuning fork.

In previous electromagnetically driven tuning forks there have been attempts to provide isolation for the magnetic flux of the drive coil, but these attempts have not been highly successful and have involved complications in the tuning fork structure. For example, in some instances, the drive coil (and/or the pickup coil) has been associated with another magnet substantially identical to the magnet forming the core of the drive coil. These two magnets, together with the magnetic material of the supporting structure, formed, in effect, a U-magnet. It was believed that the U-magnet together with the tuning fork tine adjacent to it would form a closed flux path effective to isolate the drive coil magnetic flux from the remainder of the apparatus and in particular from the tuning fork pickup coil.

The "U-magnet" arrangement is not highly effective due to the fact that the magnetic circuit it provides contains two air gaps and two magnetized cores, each of which elements is of very high reluctance due to the low permeability of the materials involved.

By the present invention, isolation for the magnetic flux generated by the driving coil is achieved by providing a magnetic circuit that, while of substantial length, is of very low reluctance compared with other alternative flux path circuits. This is accomplished without adding significantly to the complexity of the apparatus. Rather, the materials and configurations are selected for the tuning fork base which permit the magnetic circuit to be provided without substantially increasing the complexity of the base structure over that which is required for its primary function of supporting the tuning fork and supporting the drive and pickup coils in appropriate positions adjacent the tines of the tuning fork.

In addition to providing the advantages discussed above, it is an object of the present invention to provide a simple electromagnetically driven tuning fork structure formed of selected materials and configured to provide an electromagnetic flux circuit for the driving coil flux tending to isolate it from the pickup coil and preventing adverse effects due to stray magnetic fields at the pickup coil.

It is a further object of the invention to arrange the magnets forming cores for the drive coil and pickup coil to prevent undesired saturation of certain magnetic materials in the structure and to obtain desirable relative phase relationships for the electrical signals in an oscillator incorporating the electromagnetically driven tuning fork.

Other objects and advantages will be apparent from a consideration of the following description in conjunction with the appended drawings in which.

Figure 1:
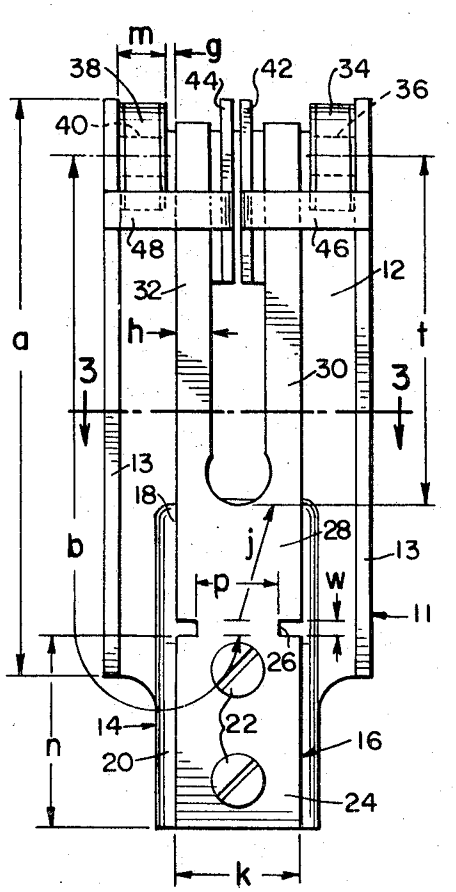
FIG. 1 is a top plan view of an electromagnetically driven tuning fork structure in accordance with the invention.
Figure 2:
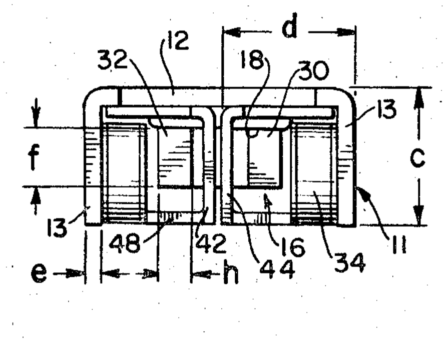
FIG. 2 is an elevational view of the apparatus of FIG. 1.
Figure 3:
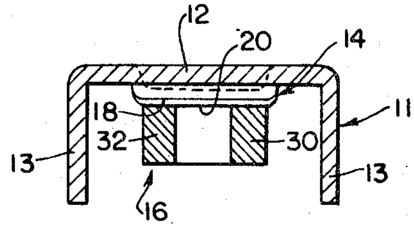
FIG. 3 is a sectional view of the apparatus of FIG. 1 taken along the line 3—3 in FIG. 1.

Referring to the drawings, FIGS. 1, 2, and 3 show a tuning fork structure in acordance with the invention. The structure includes a base 11 formed generally in the shape of a channel, with upstanding side walls 13 and a generally flat floor 12.

The floor 12 of the base structure is provided with a platform 14 for the purpose of supporting tuning fork 16. The platform 14 is preferably formed in a stamping operation and the entire base 11 can thus be formed of one piece of sheet stock. When the platform 14 is formed by bending from the stock of the base 11, it may be desirable to form the platform with two steps 18 and 20 as indicated in FIG. 1.

Of course the particular manner of forming the platform 14 illustrated in the drawings is purely illustrative and any suitable manufacturing technique may be employed for manufacture of the platform. It could, for example, be made of a separate sheet and spot-welded or bolted in place. One important characteristic of the platform 14 is that it provide a relatively large cross-section and low-reluctance path for magnetic flux to flow from the tuning fork 16 into the base 11. This is accomplished in the illustrated embodiment by forming the platform 14 out of the base material which has a high permeability. Preferly known techniques are employed to restore the high intrinsic permeability of the material of base 11 after it is formed. This is desirable because stresses set up in the material during forming can detrimentally effect the low-permeability characteristics of the material of base 11.

By way of example, the base 11 may be formed of sheet stock of a thickness of .024" consisting of a high permeability magnetic alloy designated Carpenter 49. This alloy combines a relatively high permeability of approximately 5,000 with a saturation level of approximately 15,000 gauss. The high saturation level is desirable to prevent saturation by the permanent magnet bias which is employed in the structure. As previously mentioned, the permeability characteristics of the base structure illustrated can be enhanced by relieving forming stresses by a process such as hydrogen annealing. It is therefore desirable to secure tuning fork 16 to base 11 by screws illustrated at 22 rather than by soldering or by some other such technique that would involve heating the annealed base structure or deforming it in some manner.

Fork 16 is formed of a magnetic material with a permeability as high as feasible, keeping in mind the other requirements for the tuning fork material. For example, the fork may be formed of Nispan C. For purposes of analysis, such work material is considered to have a permeability of approximately 1,000 for alternating flux in the range of constant bias flux involved in the structure.

The fork 16 is itself of known form as illustrated in prior patents. It includes a heel portion 24, a pair of tines 30 and 32, a tine junction portion 28, and a web 26 joining the heel portion 24 and the tine junction portion 28. The entire fork 16 is preferably machined from one piece of magnetic alloy stock.

Adjacent the end of tine 30 is a pickup coil 34 having centrally disposed therein a core 36. The core 36 is formed of magnetic material and normally will be a permanent magnet which supplies a magnetic bias for the pickup coil 34 in accordance with well-known techniques in the art.

Adjacent tine 32, is secured a substantially identical coil 38 including a core 40.

The function of the coil 38 is to drive the tuning fork 16 through the medium of its tine 32. An alternating current provided to coil 38 creates an alternating flux which is superimposed on the DC bias flux provided by permanent magnet 40 so that tine 32 is alternately attracted and released from the influence of coil 38. As is well-known, a tuning fork such as illustrated may very effectively be driven by driving only a single one of the tuning fork tines due to the close mechanical coupling leading to sympathetic vibration of the other tine.

It is noteworthy that only a single drive coil 38 and a single permanent magnet 40 are utilized in the driving arrangement for fork 16. Similarly, only a single coil 34 and a single permanent magnet 36 are used for the pickup arrangement. This greatly simplifies the structure of the electromagnetically driven tuning fork and eliminates subsidiary problems related to multiple coils or cores for driving or pickup sections of a tuning fork, as have been commonly utilized in the past.

The ability to provide a single-coil drive arrangement or a single-coil pickup arrangement of an effective type is a result of the appreciation that while it is necessary to provide an efficient magnetic circuit, particularly in the drive section of the tuning fork, it is unnecessary to supply an additional magnetic core to complete such circuit, provided that the low-reluctance flux path feature of the present invention is utilized.

It may be noted at this point, although a more detailed explanation is provided hereinafter, that a flux path is provided from magnetic core 40 through the upstanding wall 13 of base 11 through the floor 12 of base 11 and through platform 14 to the heel 24 of fork 16.

The low-reluctance flux path further extends through heel 24, web 26, tine junction 28, and tine 32 to the air gap between tine 32 and core 40. Due to the symmetry of the electromagnetically driven tuning fork structure, a similar low-reluctance magnetic flux path exists for the pickup section of the fork structure.

Still further isolation is provided between the tuning fork drive section and the pickup section by virtue of the magnetic shields 42 and 44. Shields 42 and 44 are helpful in reducing stray coupling between drive coil 38 and pickup coil 34, in at least two ways. First, shield 44 provides a return flux path for the magnetic flux of drive coil 38 through the floor 12 of base 11. While the complete flux circuit through shield 44 includes an air gap between shield 44 and tine 32 which is somewhat wider than the gaps between the cores 40 and 36 and their respective tines, the air gap between shield 44 and tine 32 is of much larger cross-sectional area and is accordingly of relatively low reluctance compared to that of the other air gaps. Thus the shield 44 augments the low-reluctance magnetic flux path through the tuning fork heel and base with a further low-reluctance return path for driving flux which reduces the tendency of drive flux to stray into the pickup section of the tuning fork.

Another way in which the shields 42 and 44 reduce coupling is by acting as a barrier to stray coupling from drive coil 38 through tine 32 across the air gap between the tines and through tine 30 to the pickup coil 34. Any magnetic flux reaching shields 44 and 42 has a low-reluctance path through such shields and the base 11 to the permanent magnet core 40 (or 36). The effectiveness of shields 42 and 44 is enhanced by leaving a separation between such shields, thereby creating a high reluctance for any flux path in the direction from drive coil 38 to pickup coil 34 while maintaining a relatively low-reluctance flux path from the shields to the base and thence back to its source.

Shields 42 and 44 are not exposed to high magnetic flux values from the magnetic cores 36 and 40 and hence may be made of a higher permeability material with a lower saturation level such as Carpenter HYMU 80 (permeability of 15,000).

Braces 46 and 48 are provided to give structural rigidity to shields 42 and 44 and are preferably formed of non-magnetic material such as No. 304 stainless steel.

The annealing of the base structure is preferably accomplished after the base-shield assembly operation. Shields 42 and 44 and braces 46 and 48 are preferably spot-welded in place. The resulting structure is more desirable than a silver-soldered assembly for magnetic reasons, and of course is also more desirable for structural reasons.

The high permeability of the materials of the shields 42 and 44 and the base 11 can be appreciated by comparison with that of the magnetic cores 36 and 40. These cores may typically be formed of alnico 8 and when magnetized have a permeability of approximately 3.

Figure 4:
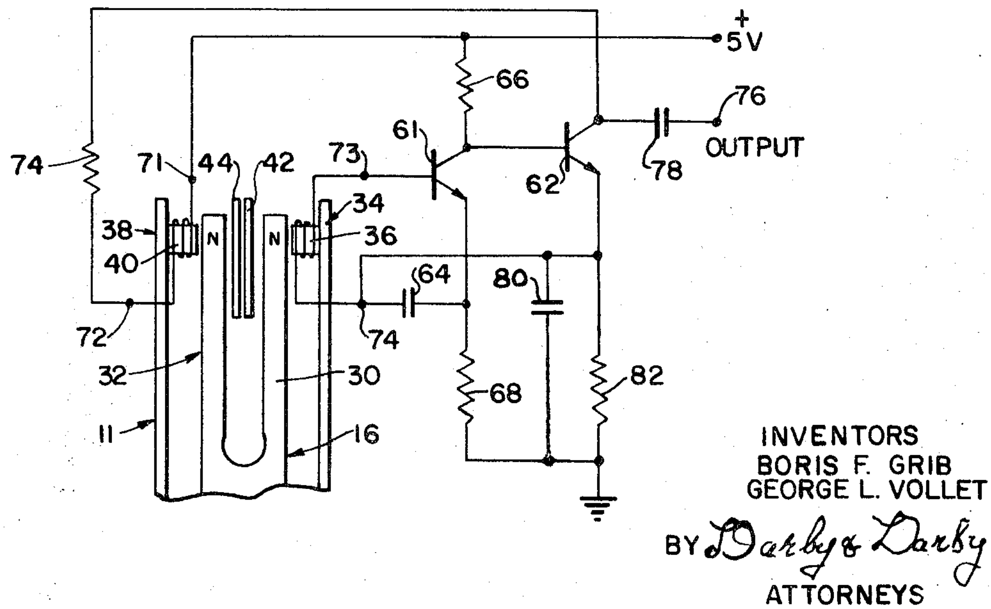
FIG. 4 is a schematic circuit diagram of a circuit appropriate for use in conjunction with an electromagnetically driven tuning fork according to the invention to provide an accurate, stable, audio frequency oscillator.

Referring now to FIG. 4, there is shown an exemplary electrical circuit to provide regenerative feedback for the electromagnetically driven tuning fork and thus provide a stable oscillator.

In FIG. 4 tuning fork 16 and its associated structure is shown only schematically. The purpose of the circuit of FIG. 4 is to amplify the current fluctuations in pickup coil 34 which correspond to the motions of tine 30 of tuning fork 16 and to feed the amplified signal to drive coil 38 in the proper phase to maintain the oscillation of tuning fork 16. The amplified signal from pickup coil 34 is also provided as an output which corresponds to the frequency of vibration of tuning fork 16 and accordingly is very precise and stable.

It should be understood that in the usual case the amplifiers will be driven to saturation so that the output of the amplifier will more nearly approximate a square than a sinusoidal wave.

Amplification in the circuit of FIG. 4 is accomplished in two stages by transistors 61 and 62, respectively. These transistors may typically be type 2N2222 transistors.

The amplifier input from drive coil 34 is connected between the base and the emitter of transistor 61 through a capacitor 64.

The collector of transistor 61 is connected to the positive terminal of a conventional power supply through resistor 66. An appropriate potential for the power supply is 5 volts as indicated.

The emitter of transistor 61 is connected to the negative or ground terminal of the power supply through resistor 68.

Bias is provided for transistor 61 by a connection from terminal 74 of the pickup coil 34 to the emitter of transistor 62. It is noteworthy that the arrangement for biasing transistor 61 from the emitter of transistor 62 provides advantages over an independent bias source (such as a voltage divider) in that the bias has a self-stabilizing characteristic resulting from the return loop configuration.

The amplified signal from transistor 61 is taken from its collector terminal and supplied to the base of transistor 62. The collector of transistor 62 is connected through pickup coil 38 by its terminals 71 and 72 through a resistor 74 to the positive terminal of the power supply. The collector of transistor 62 is also connected to output terminal 76 through a capacitor 78. The emitter of transistor 62 is connected through a capacitor 80 and a resistor 82 to ground.

Values of the circuit components of the circuit of FIG. 4 are given in the following table.

TABLE 1

Resistor 74—1,300 ohms.
Resistor 66—1,300 ohms.
Resistor 68—1,300 ohms.
Resistor 82—2,400 ohms.
Resistance of coil 38—96 ohms.
Capacitor 64—56 microfarads.
Capacitor 80—39 microfarads.
Capacitor 78—3.3 microfarads.
Load for terminal 76—10,000 ohms.

It should be noted in FIG. 4 that the cores 36 and 40 for coils 34 and 38 are magnetized symmetrically about the longitudinal axis of the tuning fork 16. That is, the pole face of each of the magnetic cores 36 and 40 facing the tuning fork tine is a north pole face. An equivalent arrangement could be provided, with both inwardly facing poles being south poles. The important consideration is that the polarity is the same rather than being different.

An important advantage is obtained by symmetric disposition of the magnetic cores in terms of the magnetic polarities. The advantage of the symmetric disposition is that the amplified feedback which is due to any stray magnetic coupling which may exist between coil 38 and coil 34 is out of phase and thus is degenerative rather than regenerative. Accordingly, the adverse effect upon the oscillator frequency which might result from stray coupling between drive coil 38 and pickup coil 34 is largely eliminated.

The importance of selection of polarity for magnets 38 and 34 will be understood from the following explanation. For current flow is a given direction between terminals 71 and 72 there will be either an increase or a decrease in the force of attraction of coil 38 on tine 32, depending on two factors. These two factors are the polarity of magnetic core 40 and the direction of winding of the coil 38. Changing either one of these factors will change the degree of attraction of tine 32 from an increase to a decrease, or vice versa. If both the coil winding direction and the magnetic polarity are changed, these changes offset each other and there is no net effective change in the circuit operation.

On the other hand, the polarity of the current induced in pickup coil 34 by stray magnetic flux from drive coil 38 depends solely upon the direction of windings of coils 34 and 38 and not at all upon the polarity of magnetic cores 36 and 40.

The direction of current in coil 30 responsive to a given motion of tine 30 is also controlled by both the coil winding direction and the magnetic core polarity, similar to the situation described in connection with the drive coil.

It is apparent that regenerative feedback must be provided to tuning fork 16 to maintain its oscillation. This means that the force applied to tine 32 in response to a motion of tine 30 must be in the proper sense to maintain oscillation of tuning fork 16 and not in the opposite sense. Having arrived at the proper circuit connections to provide regenerative feedback to drive coil 38, one would therefore not be free to reverse the direction of winding of coil 38 with no other change in the circuit, without negating the operability of the apparatus. On the other hand, one may both reverse the winding of coil 38 and simultaneously reverse the polarity of the magnetic core 40 without affecting the operation of the drive coil 38.

Thus it will be seen that by changing both coil winding direction and magnetic polarity for drive coil 38, one can reverse the polarity of the stray magnetic coupling which appears at pickup coil 34 without otherwise affecting the operation of the circuit. One can therefore arrange that the stray magnetic coupling from drive coil 38 to pickup coil 34 results in a degenerative effect on tuning fork 16 and is thereby minimized as a factor in the operation of the apparatus.

It turns out that the magnetic polarities and coil windings which provide regenerative feedback of turning fork tine motion but degenerative feedback stray magnetic coupling in all cases involve symmetric polarities for magnetic cores 36 and 40.

It is important that the phase relationships for stray flux coupling be maintained in accordance with that described above for the circuit of FIG. 4. It may be demonstrated that the stray coupling induced at terminal 73 in FIG. 4 lags the input current to the drive coil by 90 degrees. If this situation were reversed, the stray coupling at terminal 73 would lead the input current to the drive coil by 90 degrees. There is a frequency within the amplification characteristics of the circuit for which the pickup coil shunt capacity is in resonance with the pickup coil inductance. At that frequency there is a lag of 90 degrees introduced which, combined with an existing 90 degree lead, would result in regenerative feedback and undesired oscillations at the pickup coil resonant frequency.

While the operation of the apparatus presented as illustrative of the invention has been described, the manner in which the invention minimizes the problem of stray magnetic coupling can be better appreciated by reference to exemplary values of reluctance for the various magnetic flux paths which are important in determining stray magnetic coupling values.

The following analysis of the magnetic flux circuits is not intended to be precise but it is approximately correct and it will be seen that the advantages of the arrangement are so significant that even substantial lack of precision in the analysis would not materially affect the conclusion.

In Table 2 below, illustrative dimensions are given for the apparatus of FIGS. 1 through 3.

TABLE 2

| Reference letter | Dimension in inches |
|---|---|
| *a* | .78 |
| *b* | .85 |
| *c* | .184 |
| *d* | .19 |
| *e* | .024 |
| *f* | .076 |
| *g* | .0125 |
| *h* | .05 |
| *j* | .17 |
| *k* | .179 |
| *m* | .0635 |
| *n* | .275 |
| *p* | .067 |

Magnetic core diameter = .0645

The analysis of the apparatus of FIG. 1 involves consideration of a magnetic circuit having two principal loops. The first loop includes coil 38, the air gap between coil 38 and tine 32, tine 32, tine junction 28, web 26, heel 24, and the portion of base 11 between heel 24 and coil 38.

The second principal flux loop under consideration includes coil 38, the gap between coil 38 and tine 32, tine 32, tine junction 28, tine 30, the gap between tine 30 and coil 34, coil 34, and the portion of base 11 between coil 34 and coil 38. From the previous description of the two loops under consideration it will be noted that each of the loops has a portion that is common with the other loop and a portion that is not common with the other loop.

In accordance with well-known magnetic circuit theory, which is analogous to electrical circuit theory, the magnetic flux which flows in the common portions of the two loops divides between the portions of the loops which are not common in a ratio inversely proportional to their respective reluctances.

Reluctance is proportional to the length of the flux path and inversely proportional to the cross-sectional area of the flux path and to the permeability of the material. Total reluctance for a flux path through a series of several elements is obtained simply by adding the individual reluctance values.

Reluctance values are given in Table 3 below with respect to various portions of the apparatus of FIGS. 1 through 3 which are of interest, together with the dimensions and permeability values by which they were derived. Since one is concerned only with the relative magnitude of reluctance in various flux paths, arbitrary units have been selected for reluctance values such that a cube of one inch dimension would have a reluctance of 1,000 arbitrary units. The reluctance in these arbitrary units is designated $R_a$.

TABLE 3

| Element | Approx. mean L, inches | Approx. mean A, sq. inches | Permeability | $R_a = \frac{1000L}{A.\ perm.}$ |
|---|---|---|---|---|
| Magnetic core | .0635 | .0033 | 3. | 6,400 |
| Gap | .0125 | .004 | 1. | 3,100 |
| Tine | .46 | .0038 | 1000. | 120 |
| Junction | .17 | .0066 | 1000. | 26 |
| Web | .02 | .0038 | 1000. | 5 |
| Base (length wise) | .85 | .0045 | 1000. | 39 |
| Heel | .13 | .014 | 1000. | 10 |
| Base (laterally) | .4 | .0045 | 1000. | 13 |

From Table 3 above, it will be readily apparent that the non-common return flux loop through the base for the drive coil flux is the sum of the reluctances for the web, the heel, and the base (lengthwise) totaling approximately 54 arbitrary units.

It is further apparent that the non-common portion of the flux loop producing unwanted stray coupling between the drive and pickup coils is the sum of the reluctances of one tine, the gap between a tine and a coil, a magnetic core and the base (laterally). The sum of the reluctances of these elements in arbitrary units is approximately 9,600.

It will be seen therefore that the reluctance of a return flux path through the tuning fork heel and the base to the drive coil can be so reduced that the stray magnetic flux would represent no more than approximately $\frac{1}{200}$ part of the drive coil flux. This very simple and rather inexact analysis does not take into account the effect of shields 42 and 44 and is furthermore based upon very conservative values of reluctance, etc. It is therefore clear that the provision of a low-reluctance return path for drive coil flux through the tuning fork heel and the base can be exceedingly effective in inhibiting stray magnetic coupling from the drive coil to the pickup coil.

In addition to the variations and modifications to the specifically illustrated structure which have been suggested herein, numerous other variations and modifications will be apparent to those skilled in the art and accordingly the scope of the invention is not to be construed to be limited to the specific embodiments shown or suggested.

What is claimed is:

1. An electromagnetically driven tuning fork structure comprising:
- a tuning fork formed of magnetic material including two tines, a tine junction portion and a heel portion;
- a tuning fork base of high permeability material connected to the heel portion of and supporting said tuning fork and extending substantially the length thereof;
- an electromagnetic drive coil having a core of magnetic material mounted on said base near the end of a first one of said tines for electromagnetically driving said fork by means of said first one of said tines; and
- a magnetic pickup coil having a core of magnetic material mounted on said base near the end of the other one of said tines for providing an electrical signal responsive to the motion thereof, the said heel portion of said fork being in direct contact with a large area of the high permeability material of said base;
- whereby the magnetic flux produced by said drive coil is for the most part diverted through said base and prevented from passing through said pickup coil core.

2. An electromagnetically driven tuning fork structure comprising:
- a tuning fork formed of magnetic material including two tines, a tine junction portion and a heel portion;
- a tuning fork base of high permeability material connected to the heel portion of and supporting said tuning fork and extending substantially the length thereof;
- an electromagnetic drive coil having a core mounted on said base near the end of a first one of said tines for electromagnetically driving said fork by means of said first one of said tines; and
- a magnetic pickup coil having a core mounted on said base near the end of the other one of said tines for providing an electrical signal responsive to the motion thereof;
- said structure forming a plurality of magnetic flux paths including:
  - a first magnetic flux path through said heel;
  - and a second magnetic flux path through said pickup coil core;
  - the reluctance of said first magnetic flux path being of the order of at least one hundred times less than the reluctance of said second magnetic flux path; whereby the magnetic flux produced by said drive coil is for the most part prevented from passing through said pickup coil core.

3. Apparatus as claimed in claim 2 wherein said cores have magnetic polarities symmetrical with respect to the longitudinal axis of said fork.

4. Apparatus as claimed in claim 2 further including a shield of high permeability material secured to said base and extending between said tines to divert magnetic flux from said drive coil which otherwise would tend to couple to said pickup coil.

5. An electromagnetically driven tuning fork structure comprising:
- a tuning fork formed of magnetic material including two tines, a tine junction portion and a heel portion;
- a tuning fork base of high permeability material connected to the heel portion of and supporting said tuning fork and extending substantially the length thereof
- an electromagnetic drive coil having a core of magnetic material mounted on said base near the end of a first one of said tines for electromagnetically driving said fork by means of said first one of said tines; and
- a magnetic pickup coil having a core of magnetic material mounted on said base near the end of the other one of said tines for providing an electrical signal responsive to the motion thereof, the said heel portion of said fork being in direct contact with a large area of the high permeability material of said base;

said structure forming a plurality of magnetic flux paths including:

a first magnetic flux path from said tine junction through said heel and through the portion of said base between said heel and said drive coil core;

and a second magnetic flux path from said tine junction through the said other one of said tines, through the gap between the other one of said tines and said pickup coil core, through said pickup coil core, and through the portion of said base between said pickup coil core and said drive coil core;

the reluctance of said first magnetic flux path being at least one hundred times less than the reluctance of said second magnetic flux path;

whereby the magnetic flux produced by said drive coil is for the most part prevented from passing through said pickup coil core.

6. An electromagnetically driven tuning fork structure comprising:

a tuning fork formed of magnetic material including two tines, a tine junction portion and a heel portion;

a tuning fork base of high permeability material connected to the heel portion of and supporting said tuning fork and extending substantially the length thereof;

an electromagnetic drive coil having a core mounted on said base near the end of a first one of said tines for electromagnetically driving said fork by means of said first one of said tines;

a magnetic pickup coil having a core mounted on said base near the end of the other one of said tines for providing an electrical signal responsive to the motion thereof;

said structure forming a plurality of magnetic flux paths including:

a first magnetic flux path from said tine junction through said heel and through the portion of said base between said heel and said drive coil core;

and a second magnetic flux path from said tine junction through the said other one of said tines, through the gap between the other one of said tines and said pickup coil core, through said pickup coil core, and through the portion of said base between said pickup coil core and said drive coil core;

the reluctance of said first magnetic flux path being at least one hundred times less than the reluctance of said second magnetic flux path;

means for amplifying the signal from said pickup coil; and means for supplying said signal to an output terminal and to said drive coil to produce regenerative oscillations at the resonant frequency of said tuning fork.

7. An electromagnetically driven tuning fork structure comprising:

a tuning fork formed of magnetic material including two tines, a tine junction portion and a heel portion;

a tuning fork base of high permeability material connected to the heel portion of and supporting said tuning fork and extending substantially the length thereof;

an electromagnetic drive coil having a core of magnetic material mounted on said base outwardly of and near the end of a first one of said tines for electromagnetically driving said fork by means of said first one of said tines; and a magnetic pickup coil having a core of magnetic material mounted on said base outwardly of and near the end of the other one of said tines for providing an electrical signal responsive to the motion thereof, the said heel portion of said fork being in direct contact with a large area of the high permeability material of said base;

said structure forming a plurality of magnetic flux paths including:

a first magnetic flux path from said tine junction through said heel and through the portion of said base between said heel and said drive coil core;

and a second magnetic flux path from said tine junction through the said other one of said tines, through the gap between the other one of said tines and said pickup coil core, through said pickup coil core, and through the portion of said base between said pickup coil core and said drive coil core;

the reluctance of said first magnetic flux path being at least one hundred times less than the reluctance of said second magnetic flux path;

whereby the magnetic flux produced by said drive coil is for the most part prevented from passing through said pickup coil core.

No references cited.

JOHN KOMINSKI, Primary Examiner

U.S. Cl. X.R.

310—25; 331—156